(12) United States Patent
Kim et al.

(10) Patent No.: US 8,891,611 B2
(45) Date of Patent: Nov. 18, 2014

(54) METHOD AND APPARATUS FOR TRANSMITTING AND RECEIVING GRAPHICAL DATA

(75) Inventors: Si-cheol Kim, Seoul (KR); Ye-youl Lee, Seoul (KR); Yong-moo Shin, Seongnam-si (KR); Sung-bin Hong, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 13/239,370

(22) Filed: Sep. 21, 2011

(65) Prior Publication Data

US 2012/0008694 A1 Jan. 12, 2012

Related U.S. Application Data

(63) Continuation of application No. 11/833,607, filed on Aug. 3, 2007.

(30) Foreign Application Priority Data

Jan. 16, 2007 (KR) .................. 10-2007-0004877

(51) Int. Cl.

| | | |
|---|---|---|
| H04N 7/12 | (2006.01) | |
| H04N 7/173 | (2011.01) | |
| H04N 21/4402 | (2011.01) | |
| H04N 7/16 | (2011.01) | |
| H04N 21/4782 | (2011.01) | |
| H04N 21/436 | (2011.01) | |
| H04N 21/462 | (2011.01) | |
| H04N 21/41 | (2011.01) | |
| H04N 21/81 | (2011.01) | |
| H04N 21/4722 | (2011.01) | |

(52) U.S. Cl.
CPC ....... *H04N 7/163* (2013.01); *H04N 21/440218* (2013.01); *H04N 21/4782* (2013.01); *H04N 21/43615* (2013.01); *H04N 21/4622* (2013.01); *H04N 21/4122* (2013.01); *H04N 7/17318* (2013.01); *H04N 21/440236* (2013.01); *H04N 21/8146* (2013.01); *H04N 21/4722* (2013.01)
USPC ...................... 375/240.01; 725/105; 725/110

(58) Field of Classification Search
None
See application file for complete search history.

(56) References Cited

U.S. PATENT DOCUMENTS 6,836,791 B1 * 12/2004 Levi et al. ................... 709/247
7,031,339 B1 * 4/2006 Accarie ........................ 370/466

(Continued)

FOREIGN PATENT DOCUMENTS

| | | |
|---|---|---|
| JP | 2002-247580 A | 8/2002 |
| JP | 2003-23630 A | 1/2003 |

(Continued)

OTHER PUBLICATIONS

A. Kunzman, et al. "1394 high performance serial bus: the digital interface for ATV," Consumer Electronics, IEEE Transactions, Aug. 1995, pp. 893-900.*

(Continued)

*Primary Examiner* — Jung Kim
*Assistant Examiner* — Robert Leung
(74) *Attorney, Agent, or Firm* — Sughrue Mion, PLLC

(57) ABSTRACT

A method and apparatus for transmitting and receiving graphical data are provided. The apparatus for transmitting includes a graphical data generating unit that generates graphical data; an encoder that converts the graphical data into a JPEG 2000 code stream; and a transmitting unit that transmits video streams and the code stream. The apparatus for receiving includes a receiving unit that extracts an JPEG 2000 code stream; a decoder that decodes the code stream; and a display unit that displays a video stream included in the received stream and the decoded code stream. The method for transmitting the graphical data includes generating graphical data; converting the data into a JPEG 2000 code stream; and transmitting video streams and the JPEG 2000 code stream. The method for receiving the graphical data includes extracting a JPEG 2000 code stream; decoding the code stream; and displaying the decoded code stream and a video stream.

11 Claims, 9 Drawing Sheets

(56) References Cited

U.S. PATENT DOCUMENTS

| | | | |
|---|---|---|---|
| 7,581,027 | B2 | 8/2009 | Boliek et al. |
| 7,698,724 | B1 * | 4/2010 | Day ................................ 725/97 |
| 2001/0047517 | A1 | 11/2001 | Christopoulos et al. |
| 2002/0089517 | A1 * | 7/2002 | Ludtke et al. ................. 345/629 |
| 2002/0152311 | A1 * | 10/2002 | Veltman et al. ............... 709/227 |
| 2003/0009537 | A1 * | 1/2003 | Wang ............................ 709/219 |
| 2003/0113027 | A1 * | 6/2003 | Chan et al. .................... 382/240 |
| 2004/0078491 | A1 | 4/2004 | Gormish et al. |
| 2004/0208380 | A1 | 10/2004 | Aoki et al. |
| 2005/0259973 | A1 * | 11/2005 | Yamamoto .................... 386/111 |
| 2007/0053667 | A1 | 3/2007 | Sunakawa |

FOREIGN PATENT DOCUMENTS

| | | |
|---|---|---|
| JP | 2004-208266 A | 7/2004 |
| JP | 2004-221836 A | 8/2004 |
| KR | 10-2005-0094538 A | 9/2005 |
| KR | 10-2005-0097799 A | 10/2005 |
| KR | 10-2006-0010269 A | 2/2006 |
| KR | 10-2006-0062016 A | 6/2006 |
| KR | 10-2006-0099137 A | 9/2006 |
| KR | 10-2006-0116893 A | 11/2006 |
| KR | 10-0643296 B1 | 11/2006 |

OTHER PUBLICATIONS

Notification for Refusal dated Nov. 28, 2012, KIPO application 10-2007-0004877, Machine Translated on May 2, 2013.*

Kunzman, et al. "1394 High Performance Serial Bus: The Digital Interface for ATV," IEEE Transaction on Consumer Electronics, vol. 41, No. 3, Aug. 1995.*

"Tzero-ADI Introduces Wireless Transmission Solution of HD Video", [Maeil Daily Economy Sep. 13, 2006 20:01:01], pp. 1-3.

Chaney, J., et al. "eXpandable Home Theater for a networked home," Oct. 19, 2005, EE Times, Retrived Jun. 30, 2011 [http://www.eetimes.com/General/DisplayPrintViewContent?contentItemId=4013005].

Chae, Hwa-young, Gi-hoon Jung and Soon-ju Kang. "Real-Time Bandwidth Management Service for Effective Multiple Isochronous Streaming Transmission in IEEE 1394 based Home Network." vol. 31 No. 9B. Sep. 30, 2006: 838-847.

* cited by examiner

METHOD AND APPARATUS FOR TRANSMITTING AND RECEIVING GRAPHICAL DATA

CROSS-REFERENCE TO RELATED APPLICATION

This application is a Continuation of application Ser. No. 11/833,607 filed Aug. 3, 2007 which claims priority from Korean Patent Application No. 10-2007-0004877 filed on Jan. 16, 2007 in the Korean Intellectual Property Office, the disclosure of which is incorporated herein in its entirety by reference.

BACKGROUND OF THE INVENTION

1. Field of the Invention

Apparatuses and methods consistent with the present invention relate to transmitting and receiving graphical data, and more particularly, to transmitting and receiving graphical data in an expandable home theater (XHT) network.

2. Description of the Related Art

Along with the development of digital audio and video (hereinafter, referred to as A/V) processing techniques, various A/V devices, such as digital televisions (TVs), set-top boxes, digital versatile disk (DVD) players, and digital amplifiers, have been installed and used in homes and offices. A user in the home or office can conveniently control these devices using a remote control unit or the like. Accordingly, technology has been developed that connects a plurality of A/V devices to one another for systematization so as to allow the user to conveniently control the A/V devices.

To address this problem, technologies have been researched for mutually connecting a plurality of A/V devices, and combining the devices so that the user can easily control the combined A/V devices. The A/V devices are connected to other A/V devices via a network interface, thereby providing a single A/V network system.

As a part of this technology, the eXpandable Home Theater (XHT) specification, which is middleware for A/V home networking, has been developed recently. XHT technology is a digital-TV-oriented home network solution developed by Samsung Electronics Co., Ltd. The XHT specification has been adopted as a standard of the Consumer Electronics Association (CEA).

XHT technology controls multiple digital TVs as well as A/V devices connected to the digital TVs by use of IEEE 1394 cables which can stably transfer a plurality of high definition (HD) signals and Internet protocols. With XHT technology, a user can, for example, watch a digital broadcast in another room using a function for receiving the digital broadcast of the digital TV in the living room.

A memory card can act as a low-cost network interface unit (NIU) using XHT technology. Therefore, any changes to receiving systems, such as ground wave, satellite, and cable systems, can be easily performed, which reduces the economic burden of broadcast industrialists. In particular, XHT technology enables various kinds of portal services through the built-in browser of the digital TV.

Under this XHT environment, interactive data broadcast service of a digital TV is performed by a middleware included, for example, in a set-top box or a network interface unit (NIU) serving as the set-top box. The interactive-data broadcast has three standards in every broadcasting platform: the digital video broadcasting multimedia home platform (DVB-MHP) in Europe for satellite broadcasts, the open cable application platform (OCAP) in the U.S. for cable broadcasts, and the advanced common application platform (ACAP) in the U.S. for ground wave broadcasts.

FIG. 1 illustrates a graphical data communications system according to the related art.

The graphical-data communications system in the XHT network according to the related art includes a graphical-data-transmitting device 100, a graphical-data-receiving device 130, and a 1394 bus 125 that connects them.

The graphical-data-transmitting device 100 includes a graphical-control module 105, a control module 110, a Motion Pictures Expert Group (MPEG) processor 115, and a transmitting unit 120, and transmits broadcast contents transmitted from a head-end to a digital TV via the 1394 bus 125 of the XHT.

The graphical-control module 105 creates an image signal (hereinafter, referred to as "graphical data") corresponding to a hypertext transfer protocol (HTTP) request (the request from the user for a certain page) conveyed from a web browser (not illustrated) of a graphical-data-receiving device 130 via the 1394 bus 125, and transmits the image signal to the graphical-data receiving unit 130 over the 1394 bus 125. The created graphical data is transmitted to a HTML-based page.

In more detail, the control module 110 calls a function for generation of graphical data according to the HTTP request conveyed from a web browser (not illustrated) of the graphical-data-receiving device 130, and transmits the graphical data to the graphical-control module 105. Then, the control module 110 transmits an A/V stream stored in the head-end (not illustrated) or in the corresponding device to the graphical-data-receiving device 130.

The transmitting unit 120 creates the isochronal stream for isochronal transmission of the A/V stream, and transmits the graphical data created by the graphical-control module 105 to the graphical-data-receiving device 130 via the 1394 bus 125.

The MPEG processor 115 processes general A/V streams.

The graphical-data-receiving device 130 includes a control module 135, a receiving unit 140, a MPEG decoder 145, a synthesizing unit 150, and a display unit 155, and displays an HTML page corresponding to the user's request based on the A/V stream and the graphical data conveyed from the graphical-data-transmitting device 100.

The control module 135 of the graphical-data-receiving device 130 transmits the HTTP request input by a user to the graphical-data-transmitting device 100, and transmits the A/V stream to the MPEG decoder 145 in order to decode the A/V stream transmitted from the graphical-data-transmitting device 100.

The synthesizing unit 150 synthesizes graphical data provided in response to the HTML and the A/V stream decoded in the MPEG decoder 145, and display unit 155 displays the synthesized graphical data on a screen.

The related art graphical-data-transmitting device 100 and the related art graphical-data-receiving device 130 including the above-described components have a web server and a web browser, based on which the transmission and reception of the graphical data were performed. The devices must perform a separate process for modifying the graphical data when a user interface (UI) is created or controlled internally like a middleware for the interactive service (e.g., the DVB-MHP, the OCAP, the ACAP), or when the HTML-based UI is not provided.

FIG. 2 illustrates a flow of graphical data transmission according to the related art.

The graphical data transmission in the XHT network according to the related art is performed between the related art graphical-data-transmitting device 100 and the related art graphical-data-receiving device 130 of FIG. 1.

First, the user selects an optional graphical-data-transmitting device 100 connected to the XHT network through the screen of the graphical-data-receiving device 130 (operation S100).

Verification of the graphical-data-transmitting device 100 is performed through a general method, and the optional graphical-data-transmitting device 100 is selected by the user through a remote controller or a predetermined inputting means.

When the optional graphical-data-transmitting device 100 is selected S100, the user (not illustrated) requests a specific page from the graphical-data-transmitting device 100 through a remote controller or a predetermined input means. Here, the request for the specific page is an HTTP request based on the web browser of the graphical-data-receiving device 130, and the corresponding request is performed by being transmitted to the graphical-data-transmitting device 100 (operation S110).

The graphical data is created by calling a function for generation of an image signal of the control module 110 in the graphic-control module 105 of the graphical-data-transmitting device 100 (operation S120). The created graphical data is a page in HTML format corresponding to the HTTP request from the user.

When the HTML-based graphical data created in the graphical-data-transmitting device 100 is generated in operation S120, predetermined A/V stream transmitted from the head-end or pre-stored in the corresponding device is transmitted with the HTML page to the graphical-data-receiving device 130 through the 1394 bus 125 based on the transmitting unit 120 (operation S130).

The graphical-data-receiving device 130 that received the HTML page and the A/V stream decodes the A/V stream (operation S140), and combines the decoded video stream and the HTML page (operation S150) to be displayed on screen (operation S160).

SUMMARY OF THE INVENTION

An object of the present invention is to provide an apparatus for transmitting and receiving graphical data, wherein HTML-based graphical data corresponding to the user's HTTP request is converted into a JPEG 2000 code stream, and the converted code stream is inserted into an isochronal packet, thereby providing the isochronal packet.

Another object of the present invention is to provide a graphical-data-receiving device that receives the isochronal stream, extracts the JPEG 2000 code stream by removing the header of the isochronal stream, decodes the extracted JPEG 2000 code stream, and synthesizes the decoded JPEG 2000 code stream with a video stream to display graphical data corresponding to the user's request. The video stream may be predetermined.

These and other objects of the present invention will become clear to those skilled in the art upon review of the following description, attached drawings and appended claims.

According to an aspect of the present invention, there is provided an apparatus for transmitting graphical data, the apparatus including a graphical-data-generating unit for generating graphical data, an encoder for converting the graphical data into the JPEG 2000 code stream, and a transmitting unit for transmitting video streams and the JPEG 2000 code stream.

According to another aspect of the present invention, there is provided an apparatus for receiving graphical data, the apparatus including a receiving unit for extracting the JPEG 2000 code stream from the received stream, a decoder for decoding the JPEG 2000 code stream, and a display unit for displaying a video stream included in the stream and the decoded JPEG 2000 code stream.

According to another aspect of the present invention, there is provided a method of transmitting graphical data, the method including generating graphical data, converting the graphical data into the JPEG 2000 code stream, and transmitting video streams and the JPEG 2000 code stream.

According to yet another aspect of the present invention, there is provided a method of receiving graphical data, the method including extracting the JPEG 2000 code stream from the received stream, decoding the JPEG 2000 code stream, and displaying a video stream included in the stream and the decoded JPEG 2000 code stream.

BRIEF DESCRIPTION OF THE DRAWINGS

The above and other aspects of the present invention will become apparent by describing in detail exemplary embodiments thereof with reference to the attached drawings in which.

DETAILED DESCRIPTION OF EXEMPLARY EMBODIMENTS OF THE PRESENT INVENTION

Features and aspects of the present invention and methods of accomplishing the same may be understood more readily by reference to the following detailed description of exemplary embodiments and the accompanying drawings. The aspects of the present invention may, however, be embodied in many different forms and should not be construed as being limited to the embodiments set forth herein. Rather, these exemplary embodiments are provided so that this disclosure will be thorough and complete and will fully convey the concept of the invention to those skilled in the art, and the present invention will only be defined by the appended claims.

Figure 1:
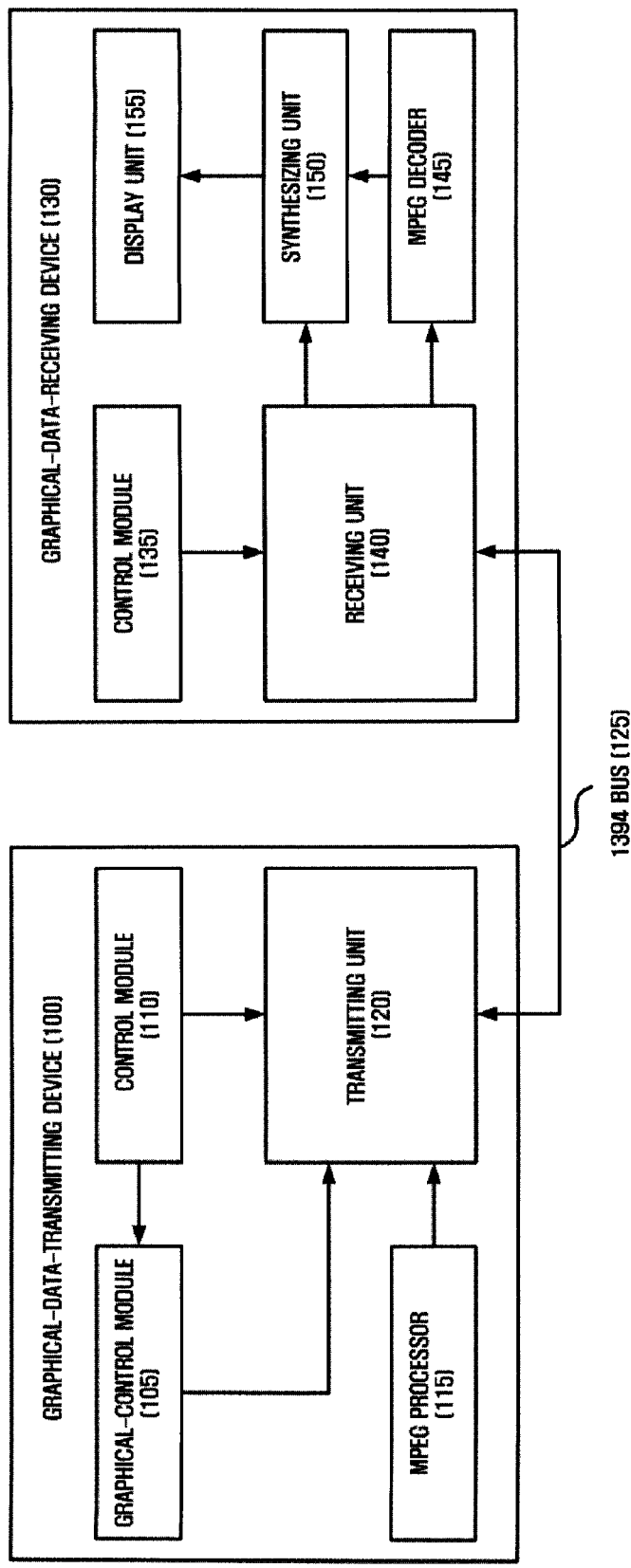
FIG. 1 illustrates a graphical-data communications system according to the related art.
Figure 2:
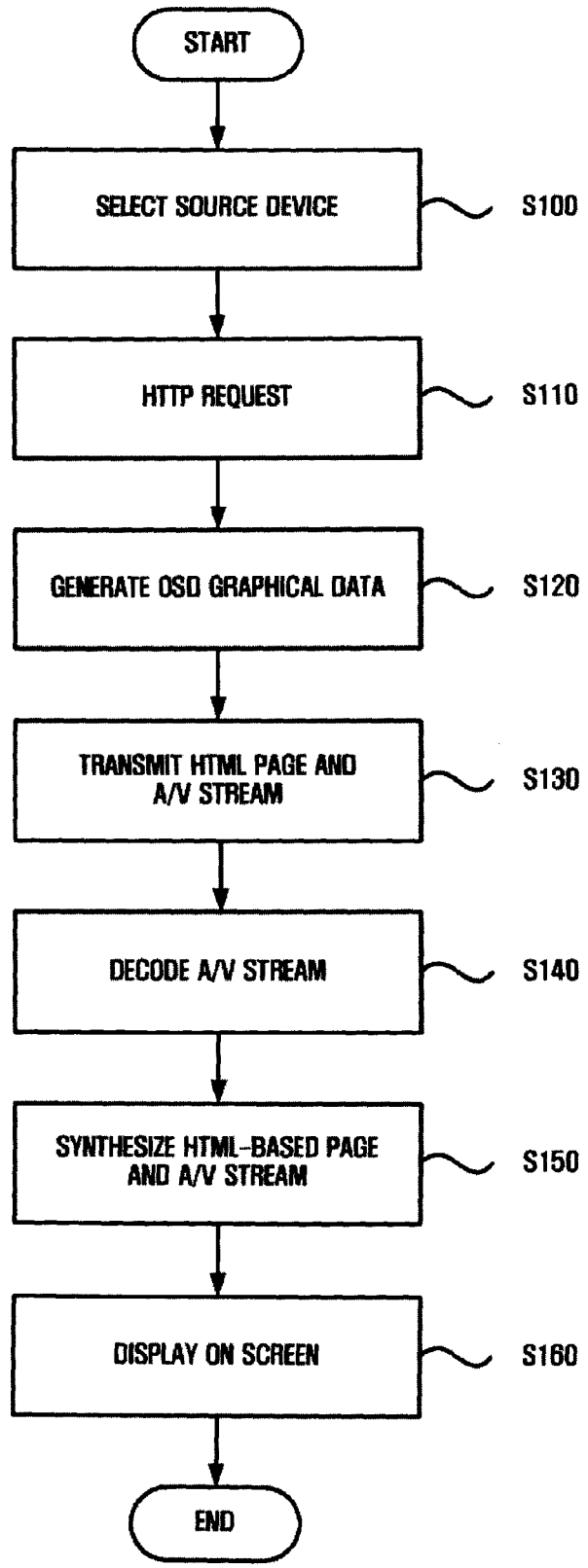
FIG. 2 illustrates a flow of graphical data transmission according to the related art.
Figure 3:
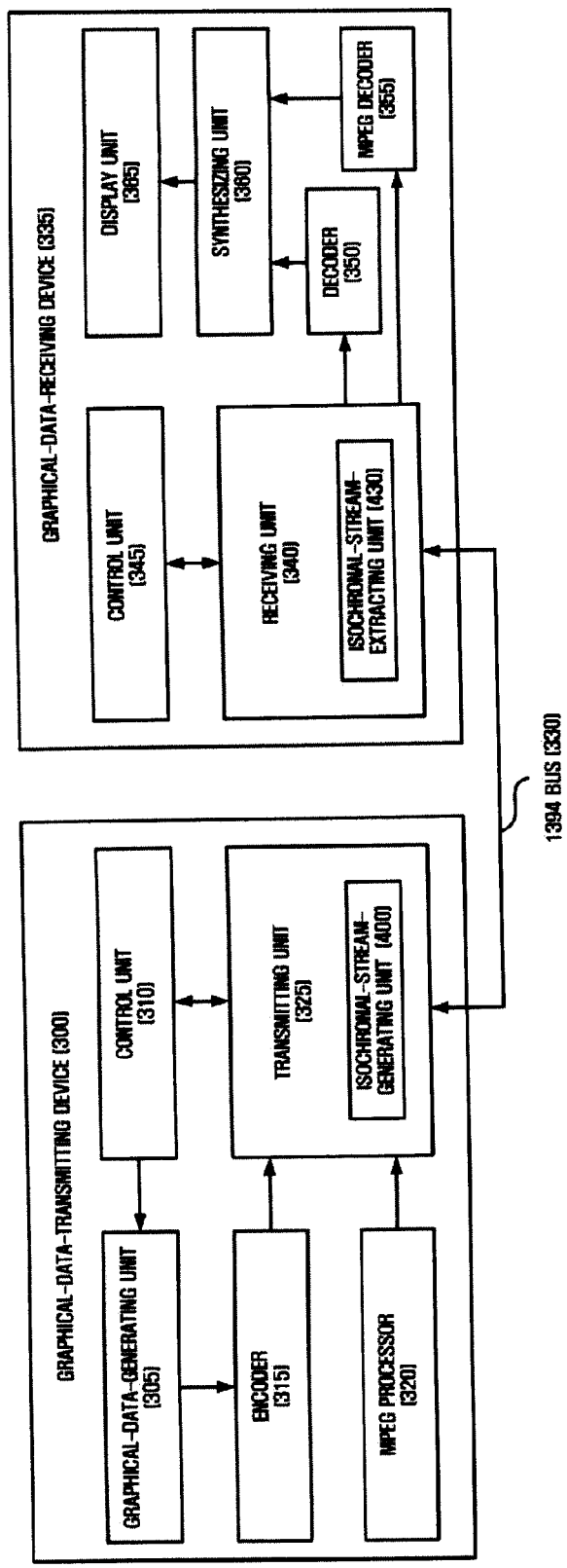
FIG. 3 illustrates a graphical-data-transceiving device according to an exemplary embodiment of the present invention.

FIG. 3 illustrates a graphical-data-transceiving device according to an exemplary embodiment of the present invention.

The XHT network includes a graphical-data-transmitting device 300 and a graphical-data-receiving device 335. The graphical-data-transmitting device 300 according to an exemplary embodiment of the present invention converts graphical data into a JPEG 2000 code stream, inserts the converted code stream into an isochronal stream, and transmits the isochronal stream to an A/V device in a XHT network. The graphical data may be predetermined.

As illustrated, a graphical-data-transmitting device 300 and a graphical-data-receiving device 335 according to exemplary embodiments of the present invention are connected to a general 1394 bus 330. The graphical-data-transmitting-device 300 includes a graphical-data-generating unit 305, a control unit 310, an encoder 315, a MPEG processor 320, and a transmitting unit 325.

The graphical-data-generating unit 305 generates graphical data corresponding to an HTTP request (the request for a specific page from a user) received from a web browser (not illustrated) of a graphical-data-receiving device 335 through the 1394 bus 330, and transmits the graphical data to the encoder 315. The generated graphical data is an HTML page, and a response corresponding to the request for a variety of data broadcast services (e.g., a text-message broadcast service, a video on demand (VOD) service, a pay-per-view (PPV) service, TV banking, TV information, or a game application) other than general A/V broadcasts.

The control unit 310 calls a function corresponding to the HTTP request transmitted from the graphical-data-receiving device 335 so that the graphical data can be generated by the graphical-data-generating unit 305.

That is, the graphical-data-generating unit 305 generates graphical data after the control unit 310 calls a function for the generation of the graphical data, and the graphical-data-generating unit 305 transmits the generated graphical data to the encoder 315.

The encoder 315 converts the HTML-based graphical data format generated in the graphical-data-generating unit 305 into JPEG 2000 format, and transmits the converted data to the transmitting unit 325. The conversion of the graphical data format denotes a conversion into a code stream including JPEG 2000 packets. The generation of the code stream of the JPEG format in the encoder 315 is performed through a wavelet used to process a digital signal or compress an image, and the code stream of the JPEG 2000 format will be further with reference to FIG. 5 below.

The MPEG processor 320 is a general processor for transmitting an A/V stream pre-stored in the head-end (not illustrated) or the graphical-data-transmitting device 300 to the graphical-data-receiving device 335 according to a user's request, and transmits an A/V stream to the transmitting unit 325. The A/V stream may be predetermined.

The transmitting unit 325 transmits the JPEG 2000 code stream transmitted from the encoder 315 and the A/V stream to the graphical-data-receiving device 335 through the 1394 bus 330.

The transmitting unit 325, which conforms to a standard prescribed by IEEE 1394, further includes an isochronal-stream-generating unit 400 for inserting the JPEG 2000 code stream format transmitted from the encoder 315 into the isochronal stream. The transmitting unit 325 packetizes the isochronal stream according to the isochronal transmission, and then transports the isochronal stream to the graphical-data-receiving device 335.

Here, the transported stream includes the JPEG 2000 code stream and a general A/V stream.

A detailed description of the isochronal-stream-generating unit 400 included in the transmitting unit 325 will follow below with reference to FIG. 4.

The 1394 bus 330 is a connecting means in the XHT network for connecting the graphical-data-transmitting device 300 and the graphical-data-receiving device 335. The 1394 bus 330 transmits the isochronal stream and the A/V stream provided by the graphical-data-transmitting device 300 to the graphical-data-receiving device 335, and transmits a general control command for the graphical-data-transmitting device 300 and the graphical-data-receiving device 335.

The graphical-data-receiving device 335 that receives the isochronal stream through the 1394 bus 330 includes a receiving unit 340, a control unit 345, a decoder 350, a MPEG decoder 355, a synthesizing unit 360, and a display unit 365.

The control unit 345 transmits control commands for requesting A/V broadcast services input by a apparatus (e.g., a remote control) and a variety of data broadcast services (e.g., a text-message broadcast service, a video on demand (VOD) service, a pay-per-view (PPV) service, TV banking, TV information, or a game application) other than the A/V broadcasts to the graphical-data-transmitting device 300 through the receiving unit 340. The apparatus may be predetermined.

Also, the control unit 345 separates and extracts the A/V stream and the JPEG 2000 code stream from the isochronal stream transmitted from the transmitting device 300, transmits the A/V stream to the MPEG decoder 355 to be decoded, and transmits the JPEG 2000 code stream to the decoder 350 to be decoded in a format for synthesizing with the video stream.

The receiving unit 340 receives the isochronal stream including the A/V stream and the JPEG 2000 code stream, extracts the JPEG 2000 code stream from the received isochronal stream, and transmits the extracted JPEG 2000 code stream to the JPEG 2000 decoder.

Figure 4A:
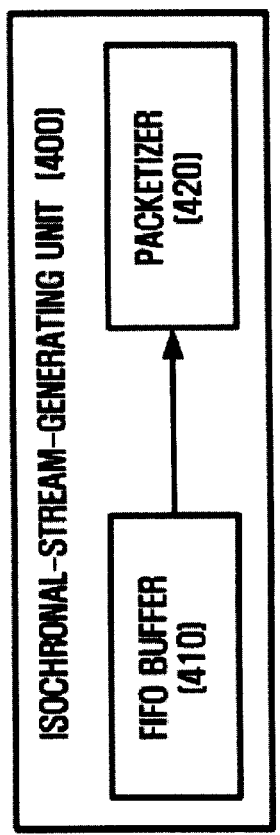
FIGS. 4A and 4B illustrate an isochronal-stream-generating unit and an extracting unit, respectively, according to an exemplary embodiment of the present invention.
Figure 4B:
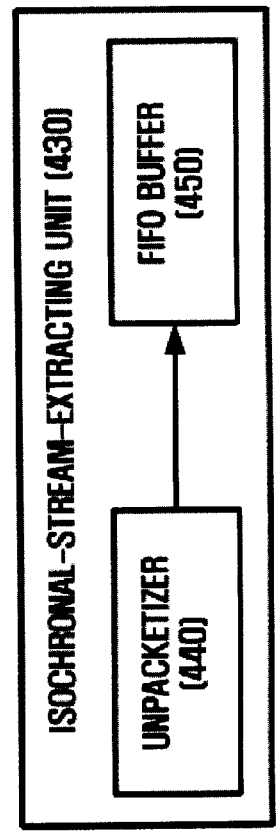

Here, the extraction of the JPEG 2000 code stream is performed by an isochronal stream extracting unit 430 further included in the receiving unit 340 by removing a header of the isochronal stream. The isochronal-stream-extracting unit 430 of the graphical-data-receiving device 335 is a module corresponding to the isochronal-stream-generating unit 400 of the graphical-data-transmitting device 300. The isochronal-stream-generating unit 400 and the isochronal-stream-extracting unit 430 are shown in FIGS. 4A and 4B, respectively, and will be described in more detail below.

The JPEG 2000 code stream extracted by removing a header of the isochronal stream is transmitted to the decoder 350, and is then transmitted to the synthesizing unit 360 in a graphical data format for synthesizing with a video stream.

The receiving unit 340 transmits general control commands, which are received from the control unit 345, to the graphical-data-transmitting device 300.

The decoder 350 receives the JPEG 2000 code stream extracted from the isochronal stream extracting unit 430, decodes the JPEG 2000 code stream into graphical data, and transmits the graphical data to the synthesizing unit 360. The MPEG decoder 355 decodes and transmits the general A/V stream to the synthesizing unit 360 as well.

The synthesizing unit 360 synthesizes the graphical data transmitted from the decoder 350 and the video stream among the A/V streams transmitted from the MPEG decoder 355. The synthesis performed in the synthesizing unit 360 can differ depending on settings pre-set from the user (not illustrated), the graphical-data-transmitting device 300, and/or the graphical-data-receiving device 335. The graphical data and the video stream synthesized using a certain method is displayed on the display unit 365. The certain method may be predetermined.

The graphical-data-receiving device 335 including the components discussed above may include a plasma display panel (PDP), a liquid crystal display (LCD) monitor, or an audio receiver, but a digital TV is advantageous as the graphical-data-receiving device 335 in the XHT network.

The 1394 bus 330 is a connecting means of the graphical-data-transmitting device 300 and the graphical-data-receiving device 335, but it is not limited thereto. That is, wired and wireless transceiving methods can be used for the connecting means of the devices 300 and 335.

As mentioned above, the graphical-data-transceiving device according to an exemplary embodiment of the present invention is separated, based on the XHT network, into the graphical-data-transmitting device 300 and the graphical-data-receiving device 335, or may be a single device.

That is, the graphical-data-transmitting device 300 according to an exemplary embodiment of the present invention converts graphical data corresponding to a user's request into a JPEG 2000 format, inserts the converted graphical data into an isochronal stream, and transmits the isochronal stream to the graphical-data-receiving device 335 based on the XHT network along with A/V streams. The graphical data and the A/V streams may each be predetermined.

The graphical-data-transmitting device 300 conforms to one of DVB-MHP, OCAP, and ACAP middleware. The graphical data created in the corresponding device is converted into the JPEG 2000 code stream and transmitted in one of the cases where the HTML page-based UI prescribed by the XHT network is not provided or an application creates or controls the graphical data corresponding to the user's request. The application may be predetermined.

FIGS. 4A and 4B illustrate an isochronal-stream-generating unit 400 and an isochronal-stream-extracting unit 430, respectively, according to an exemplary embodiment of the present invention.

The transmitting unit 325 of the graphical-data-transmitting device 300 and the receiving unit 340 of the graphical-data-receiving device 335 according to an exemplary embodiment of the present invention, as mentioned in FIG. 3, include the isochronal-stream-generating unit 400 and the isochronal-stream-extracting unit 430, respectively.

As illustrated in FIG. 4A, the isochronal-stream-generating unit 400 included in the transmitting unit 325 mentioned in FIG. 3 includes a First-In-First-Out (FIFO) buffer 410, and a packetizer 420 for an isochronal transmission of the JPEG 2000 code stream recorded in the FIFO buffer 410.

The FIFO buffer 410 records the code stream of the JPEG 2000 format transmitted from the encoder 315. After the graphical data is converted in the encoder 315, the JPEG 2000 code stream is recorded therein according to the order of being converted in the encoder 315 and then transmitted to the FIFO buffer 410. The JPEG 2000 code stream recorded in the FIFO buffer 410 is packetized in the packetizer 420 for isochronal transmission to generate the JPEG 2000 code stream recorded in the FIFO buffer 410 as the isochronal packet. The generation of the isochronal packet is performed by inserting a JPEG 2000 code stream into a data region 735 of FIG. 7, described in further detail below. The JPEG 2000 code stream may be predetermined. The isochronal stream including a plurality of isochronal packets generated in such a manner is transported to the graphical-data-receiving device 335 through the transmitting unit 325.

The isochronal-stream-generating unit 400 including the components described above may be configured as the transmitting unit 325, as a single module of the transmitting unit 325, or separated as a module separate from the transmitting unit 325.

The graphical-data-receiving device 335 for receiving the isochronal stream transported through the above process extracts the A/V stream and the JPEG 2000 code stream through the isochronal-stream-extracting unit 430.

As shown in FIG. 4B, the isochronal-stream-extracting unit 430 that extracts the JPEG 2000 code stream includes an unpacketizer 440 and a FIFO buffer 450.

The unpacketizer 440 extracts the JPEG 2000 code stream by removing a header of the isochronal packets included in the isochronal stream, and records the extracted JPEG 2000 code stream in the FIFO buffer 450. The JPEG 2000 code stream recorded in the FIFO buffer 450 is conveyed to the decoder 350 mentioned in FIG. 3 and decoded as graphical data.

The isochronal-stream-extracting unit 430 corresponding to the isochronal stream generating unit 400 may be configured as the receiving unit 340, as a single module of the receiving unit 340, or separately as a module separate from the receiving unit 340. However, the configuration is not limited thereto.

Figure 5:
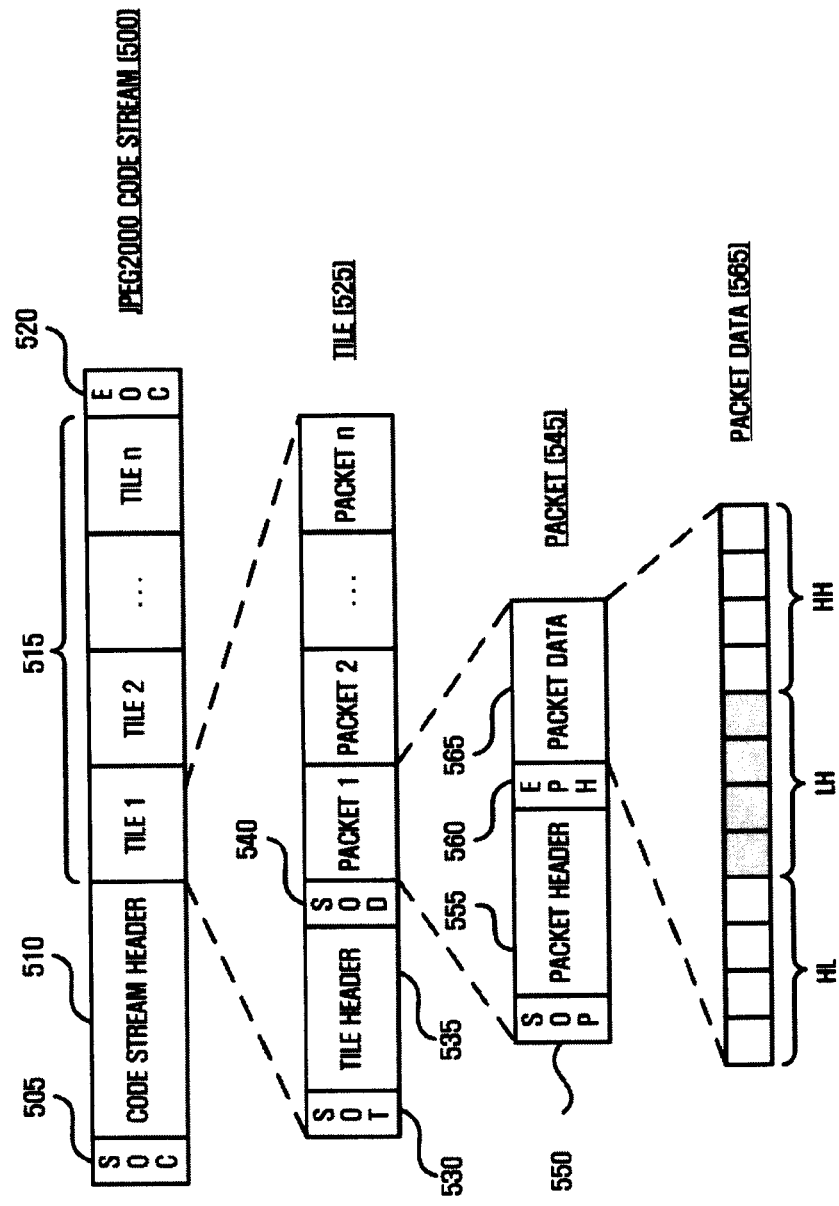
FIG. 5 illustrates a JPEG 2000 code stream.

FIG. 5 illustrates a JPEG 2000 code stream.

The JPEG 2000 code stream 500 includes a start of code stream (SOC) 505, a code-stream header 510, an n-tile stream 515, and an end of code stream (EOC) 520.

The SOC 505 includes information for decoding the n-tile stream 515 included in the JPEG 2000 code stream 500, and the code stream header 510 contains information about the size of the graphical data encoded by a header reporting start of the JPEG 2000 code stream 500, the size of the n-tile stream 515, and the number of components.

At least one tile 525 of the n-tile stream 515 includes information on a start of tile (SOT) 530 reporting start of the tile stream, a tile header 535 including the size of graphical data packetized by indication showing start of the tile 525, the size of the tile stream, and the number of the components, and the tile 525 also includes a start of data (SOD) 540 reporting start of an n-packet stream.

At least one packet 545 included in the n-packet stream of tile 525 contains a start of packet (SOP) 550, a packet header 555, an end-packet header 560, and a packet data 565.

The packet data 565 includes sub images HL, LH, HH of the graphical data generated in the graphical-data-transmitting device 300.

That is, when a format of the graphical data corresponding to the user's request is encoded to the JPEG 2000 code stream 500 by the encoder 315, it is transmitted to the graphical-data-receiving device 335 by the transmitting unit 325.

Figure 6:
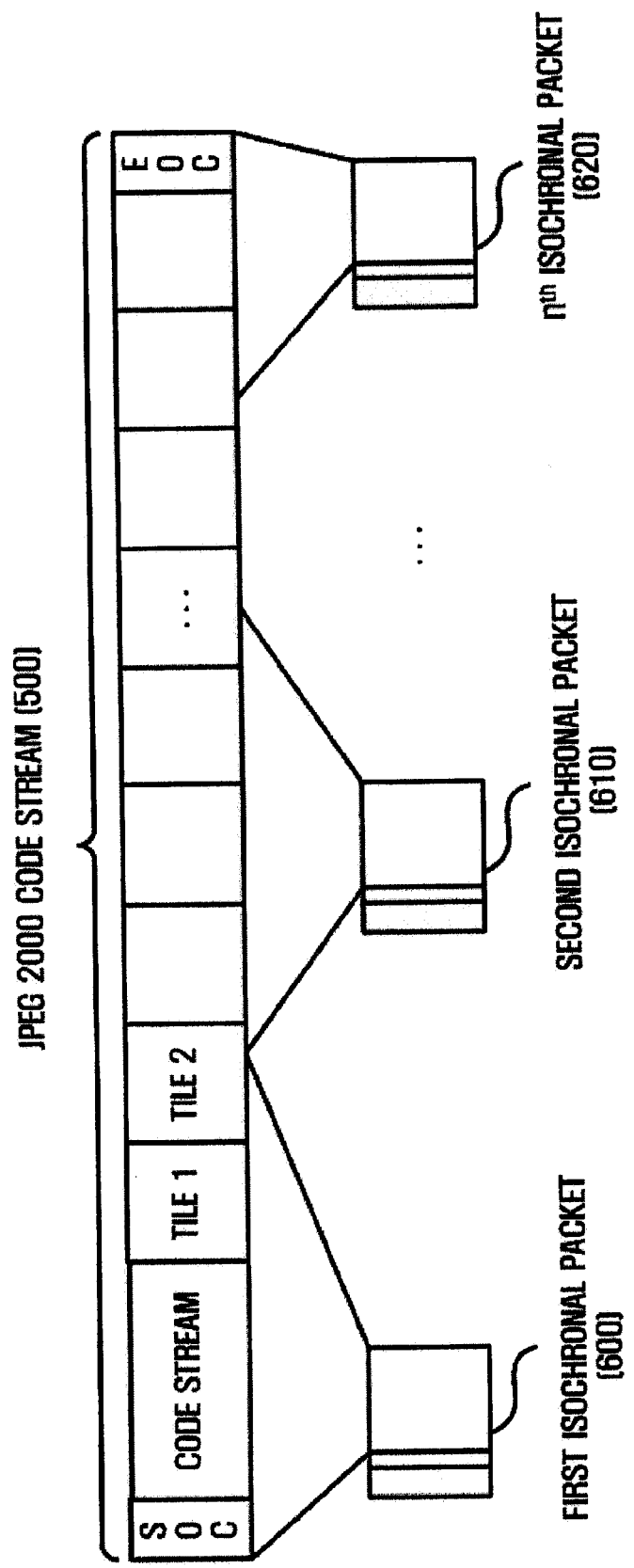
FIG. 6 illustrates inserting a JPEG 2000 code stream into an isochronal packet according to an exemplary embodiment of the present invention.

FIG. 6 illustrates inserting a JPEG 2000 code stream into an isochronal packet according to an exemplary embodiment of the present invention.

The insertion of the JPEG 2000 code stream 500 into the isochronal packet is performed in the isochronal-stream-generating unit 400 of the graphical-data-transmitting device 300, and then transmitted to the graphical-data-receiving device 335.

The JPEG 2000 code stream 500 is converted in the encoder 315 mentioned in FIG. 3, and transmitted to the isochronal-stream-generating unit 400 of the transmitting unit 325 for the isochronal transmission.

The JPEG 2000 code stream 500 transported to the isochronal stream generating unit 400 is sequentially recorded in the FIFO buffer 410, 450 of the corresponding module.

The JPEG 2000 code stream 500 recorded in the FIFO buffer is packetized by the packetizer 420 into isochronal packets, shown in FIG. 6 as first isochronal packet 600, second isochronal packet 610, and an nth isochronal packet 620, each having a fixed size and having a set of information. The sets of information may be predetermined. The packetized JPEG 2000 code stream 500 was mentioned above in FIG. 5, and a detailed description thereof is therefore omitted here.

That is, n-isochronal packets are created, the number of the n-isochronal packets corresponding to the size of the JPEG 2000 code stream 500 packetized in the isochronal-stream-generating unit 400, and the JPEG 2000 code stream 500 is inserted into data regions of each isochronal packet, thereby producing a successive stream.

The inserted n-isochronal packets, for example, the first isochronal packet 600, the second isochronal packet 610, and the nth isochronal packet 620, shown in FIG. 6, are transmitted to the graphical-data-receiving device 335 through the 1394 bus 330.

The graphical-data-receiving device 335 may transmit the isochronal streams transmitted from the graphical-data-transmitting device 300 to the isochronal-stream-extracting unit 430 in the case where the isochronal-stream-extracting unit 430 is separate from the receiving unit 340. The isochronal-stream-extracting unit 430 removes a packet header or a connection isochronal packet (CIP) header of each isochronal packet, and extracts the JPEG 2000 code stream 500.

As mentioned above, the JPEG 2000 code stream 500 extracted by removing the header is decoded in the decoder 350, and is synthesized with the video stream to be displayed.

Figure 7:
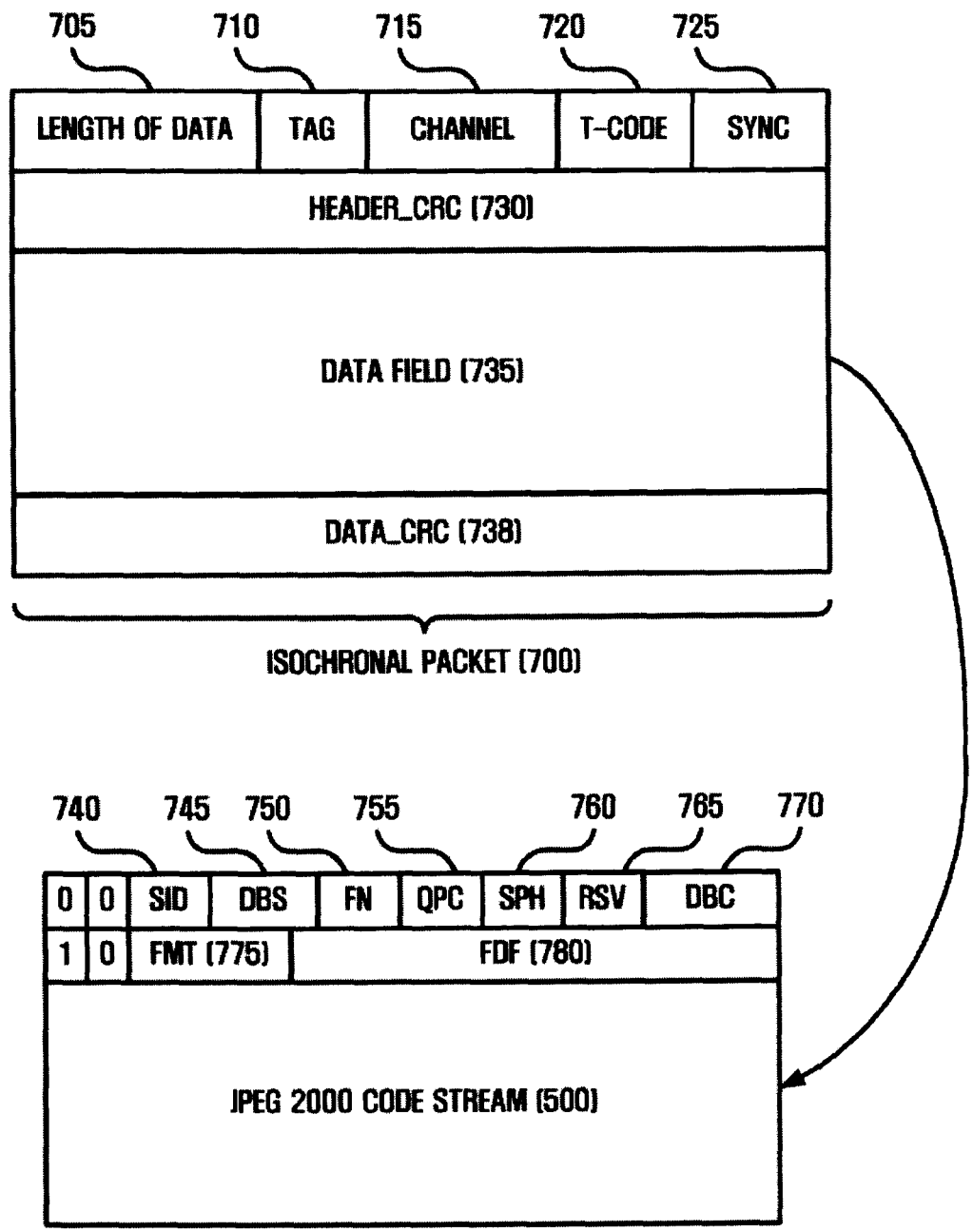
FIG. 7 illustrates an isochronal packet according to an exemplary embodiment of the present invention.

FIG. 7 illustrates an isochronal packet according to an exemplary embodiment of the present invention.

The isochronal packet according to an exemplary embodiment of the present invention is generated in isochronal-stream-generating unit 400 of the graphical-data-transmitting device 300, and transmitted to the graphical-data-receiving device 335.

As illustrated in FIG. 7, the header of an isochronal packet 700 includes a length of data 705, a tag 710 displaying if a header of a common isochronal packet (CIP) exists, a channel 715 displaying a channel number through the isochronal packet transmission, a transmission code (t-code) 720 displaying a single packet, and a connection isochronal packet (CIP) header including a sync 725 for displaying an extent of the packet, a header_cyclic redundancy check (HEADER_CRC) 730, a data field 735, and a data_CRC 738.

The data field 735, wherein the JPEG 2000 code stream 500 is recorded, can include one or more fields. The information for checking the data transmission error is recorded in the data_CRC 738.

The data field 735 of the isochronal packet 700 includes a source node ID (SID) 740 for displaying a node ID of the graphical-data-transmitting device 300 that transmits the isochronal packet according to the 1394 bus 330 included in the CIP header, a 1-byte data block size (DBS) 745 for displaying the length of data blocks in quadlets (4-bytes), a 2-bit fractional number (FN) 750 for displaying the number of data blocks of the divided source packet, and a 3-bit quadlets padding count (QPC) 755 used when the FN 750 has a non-zero value.

The data field 735 is set to 1 when a source packet has a certain source packet header, the data field 735 further includes a 1-bit source packet header (SPH) 760 used to extract drop-out during the source packet transmission, reserved (RSV) 765 and a data block continuity counter (DBC) 770 for indicating the number of current transmission data blocks that are separated and transmitted. Also, the to-be-transmitted data format is detailed in a format ID (FMT) 775, and a 3-byte format dependent field (FDF) 780 is an information field for displaying a margin field.

The isochronal packet 700 is generated in the isochronal stream generating unit 400 of the graphical-data-transmitting device 300, and then transmitted to the graphical-data-receiving device 335.

Figure 8:
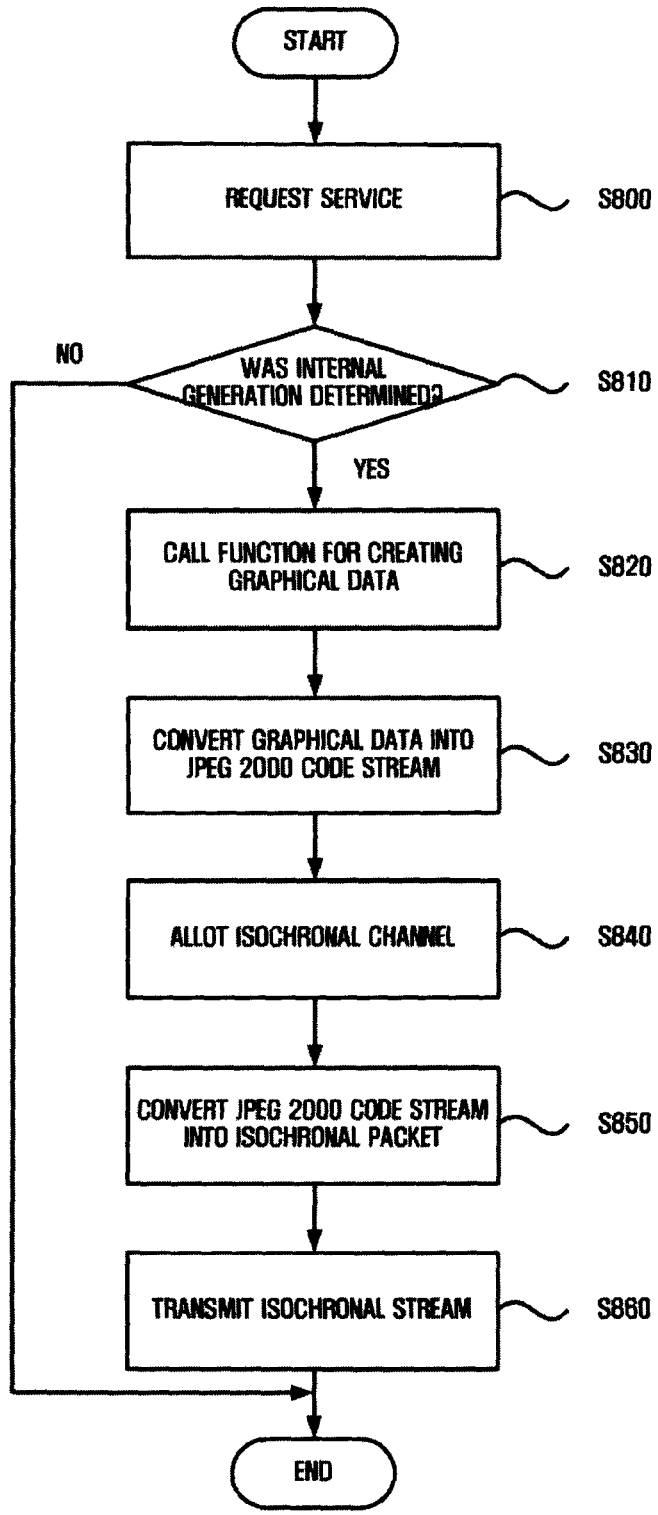
FIG. 8 is a flowchart illustrating graphical-data transmission according to an exemplary embodiment of the present invention.

FIG. 8 is a flowchart illustrating graphical data transmission according to an exemplary embodiment of the present invention.

A process of transmitting the graphical data in the XHT network according to an exemplary embodiment of the present invention includes converting the graphical data into JPEG 2000 format in the graphical-data-transmitting device 300, inserting the converted graphical data into the isochronal packet 700, and transmitting the isochronal packet 700 to the graphical-data-receiving device 335.

The user selects the graphical-data-transmitting device 300 which is included in the XHT network through the display unit 365 of the graphical-data-receiving device 335, and requests a service of the graphical-data-transmitting device 300 by selecting a menu icon on the graphical-data-transmitting device 300 S800.

The request of a specific service is a general service request. That is, when the user inputs the control command corresponding to the menu icon of the graphical-data-transmitting device 300, the HTTP request requesting a menu display from a web browser of the graphical-data-receiving device 335 is transmitted to the graphical-data-transmitting device 300. A web server of the graphical-data-transmitting device 300 transmits the HTML page including a main menu corresponding to the HTTP request to the graphical-data-receiving device 335.

That is, requesting a specific service S800 is accomplished based on a selection of sub menus on the HTML page transmitted to the graphical-data-receiving device 335.

When a certain service is requested from the graphical-data-transmitting device 300 in operation S800, the control unit 310 determines if the corresponding request is for a general XHT application or an application that generates graphical data internally S810.

According to a result of the determination, if it is determined that the application of the user's request is general, i.e., generation not internal to the general-data-transmitting device 300, no action is taken and the process ends. On the other hand, if it is determined that the application that the user requested is generated inside the graphical-data-transmitting device 300, the functions for creating the graphical data are called S820.

The graphical data corresponding to the user's request is created in the graphical-data-generating unit 305 based on the call for the graphical-data-generating functions, and is transmitted to the encoder 315.

The encoder 315 converts the graphical data transmitted from the graphical-data-generating unit 305 into a JPEG 2000 code stream 500 S830.

The JPEG 2000 code stream 500 was mentioned in FIG. 5, and a detailed description thereof will be omitted here.

The graphical data is transmitted to the transmitting unit 325, and is allotted an isochronal channel for the transmission S840.

The JPEG 2000 code stream 500 is inserted through the isochronal-stream-generating unit 400 included in the 1394 module and then converted into a number of isochronal packets 700 S850. The number of isochronal packets may be predetermined.

The number of isochronal packets 700, as isochronal streams, are transmitted to the graphical-data-receiving device 335 S860, and, therefore, the transmission of the isochronal stream including the JPEG 2000 code stream 500 created in the graphical-data-transmitting device 300 ends.

Figure 9:
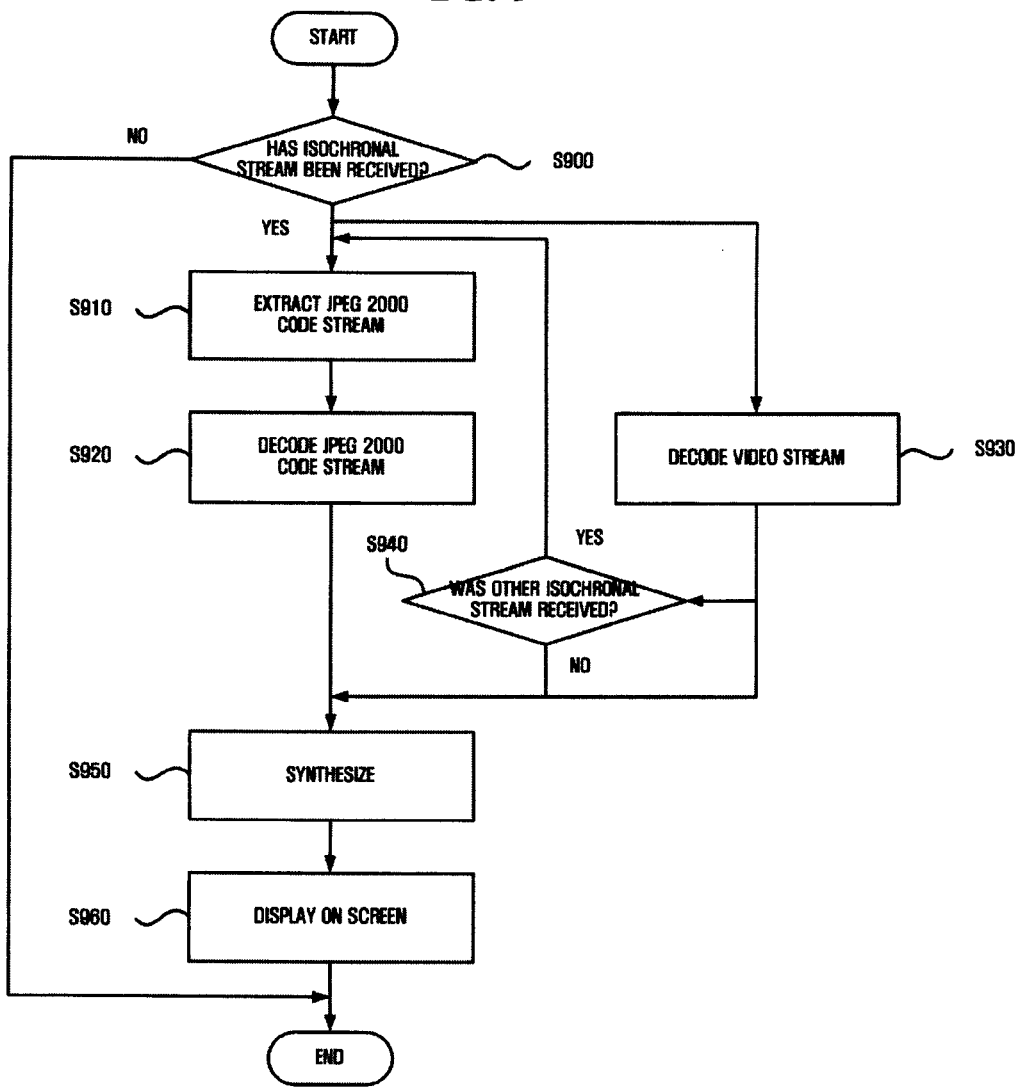
FIG. 9 is a flowchart illustrating graphical-data reception according to an exemplary embodiment of the present invention.

FIG. 9 is a flowchart illustrating graphical data reception according to an exemplary embodiment of the present invention.

The reception of the graphical data in the XHT network according to an exemplary embodiment of the present invention refers to the reception of the isochronal stream transmitted, for example, in operation S860 of FIG. 8.

The graphical-data-receiving device 335 determines if the isochronal stream has been received from the graphical-data-transmitting device 300 S900.

According to a result of the determination, if it is determined that the isochronal stream is received, the JPEG 2000 code stream 500 is extracted S910.

The extraction of the JPEG 2000 code stream 500 is performed by removing the packet header of the isochronal packet 700 including the corresponding code stream.

The isochronal-packet-header-removed JPEG 2000 code stream 500 is transmitted to the decoder 350, and the decoding process for restoring into the graphical data requested by the user is performed to decode the JPEG 2000 code stream S920.

If it is determined that the video stream transmitted from the graphical-data-transmitting device 300 is received, the decoding process is performed by the MPEG decoder 355 to decode the video stream S930.

When the decoding process of the JPEG 2000 code stream 500 and the video stream ends (operations S920 and S930, respectively), the corresponding data is transmitted to the display unit 365.

During transmission to the display unit 365, the reception of another isochronal stream can be determined S940. If it is determined that another isochronal stream is received, the operations S910 to S930 are repeated.

The display unit 365 synthesizes the transmitted JPEG 2000 code stream 500 and video stream S950, and displays the synthesized image on a screen S960.

In operation S960, if specific input is transmitted by the user, it is recognized as an event request with respect to the application that generated the corresponding graphical data, and then is transmitted to the graphical-data-transmitting device 300 through a 1394 Async channel.

An event handler of the graphical-data-transmitting device 300 converts the input transmitted from the remote control into a key code for the application, and then transmits it to the application. The application executes the corresponding operation, and the graphical data converted during the operation repeats the operation.

What is claimed is:

1. An apparatus for transmitting imaging data, the apparatus comprising:
    an imaging data generating unit that generates HTML-based imaging data which is a certain page corresponding to a request from a user;
    an encoder that converts the HTML-based imaging data into a code stream of a JPEG 2000 format, the code stream including JPEG 2000 packets; and
    a transmitting unit that inserts the code stream of the JPEG 2000 format converted from the encoder into an isochronal digital audio and video (A/V) stream, packetizes the isochronal digital A/V stream for transmitting, and transmits the packetized isochronal digital A/V stream to a receiving device through a channel,
    wherein the transmitting unit transmits a general control command for requesting broadcast services in addition to the isochronal digital A/V stream,
    wherein the transmitting unit transmits the packetized isochronal digital A/V stream in a case where the imaging data cannot be generated as an HTML-based page.

2. The apparatus of claim 1, wherein the transmitting unit transmits the code stream of the JPEG 2000 format in a case where a predetermined application generates and controls the imaging data itself.

3. The apparatus of claim 1, wherein the transmitting device is based on as eXpandable Home Theater (XHT) network.

4. An apparatus for receiving imaging data, the apparatus comprising:
    a receiving unit that receives an isochronal digital audio and video (A/V) stream having inserted therein a code stream of a JPEG 2000 format, and extracts the code stream of the JPEG 2000 format from the received isochronal digital A/V stream;
    a decoder that decodes the code stream of the JPEG 2000 format; and
    a display unit that displays a video stream included in the received isochronal digital A/V stream and the decoded code stream of the JPEG 2000 format,
    wherein the code stream of the JPEG 2000 format is a stream of a certain HTML page corresponding to a request from a user,
    wherein the receiving unit receives a general control command for requesting broadcast services in addition to the isochronal digital A/V stream,
    wherein the receiving unit receives the isochronal digital audio and video (A/V) stream having inserted therein the code stream in a case where imaging data cannot be generated as an HTML-based page.

5. The apparatus of claim 4, wherein the receiving unit comprises an isochronal stream extracting unit for removing a header of the received isochronal digital A/V stream and extracting the code stream of the JPEG 2000 format.

6. The apparatus of claim 4, further comprising a synthesizing unit for synthesizing the decoded code stream of the JPEG 2000 format or the video stream.

7. A method of transmitting imaging data, the method comprising:
    generating HTML-based imaging data which is a certain page corresponding to a request from a user;
    converting the HTML-based imaging data into a code stream of a JPEG 2000 format, the code stream including JPEG 2000 packets;
    inserting the code stream of the JPEG 2000 format into an isochronal digital audio and video (A/V) stream;
    packetizing the isochronal digital A/V stream for transmitting; and
    transmitting the packetized isochronal digital A/V stream to a receiving device through a channel,
    wherein the transmitting includes transmitting a general control command for requesting broadcast services in addition to the isochronal digital A/V stream,
    wherein the packetized isochronal digital A/V stream is transmitted in a case where the imaging data cannot be generated as an HTML-based page.

8. The method of claim 7, wherein the converting process is performed by converting the imaging data in to the code stream of the JPEG 2000 format in a case where a predetermined application generates and controls the imaging data itself.

9. A method of receiving imaging data, the method comprising:
- receiving an isochronal digital audio and video (A/V) stream having inserted therein a code stream of a JPEG 2000 format;
- extracting the code stream of the JPEG 2000 format from the received isochronal digital A/V stream;
- decoding the code stream of the JPEG 2000 format; and
- displaying a video stream included in the received isochronal digital A/V stream, and the decoded code stream of the JPEG 2000 format,
- wherein the code stream of the JPEG 2000 format is a stream of a certain HTML page corresponding to a request from a user,
- wherein the receiving comprises receiving a general control command for requesting broadcast services in addition to the isochronal digital A/V stream,
- wherein the isochronal digital audio and video (A/V) stream having inserted therein the code stream is received in a case where imaging data cannot be generated as an HTML-based page.

10. The method of claim 9, wherein the extracting process is performed by removing a header of the received isochronal digital A/V stream and extracting the code stream of the JPEG 2000 format.

11. The method of claim 9, further comprising synthesizing the decoded code stream of the JPEG 2000 format or the video stream.

* * * * *